(12) United States Patent
Farmer et al.

(10) Patent No.: US 7,689,810 B2
(45) Date of Patent: Mar. 30, 2010

(54) PROCESSOR GENERATING CONTROL SIGNALS INCLUDING DETECTION DURATION FOR SATELLITE POSITIONING SYSTEM RANGING SIGNAL DETECTION CIRCUIT

(75) Inventors: Dominic Gerard Farmer, Los Gatos, CA (US); Douglas Grover, San Diego, CA (US); Cristina A. Seibert, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 11/625,772

(22) Filed: Jan. 22, 2007

(65) Prior Publication Data

US 2007/0300045 A1    Dec. 27, 2007

Related U.S. Application Data

(60) Provisional application No. 60/815,675, filed on Jun. 21, 2006.

(51) Int. Cl.
  *G06F 15/16* (2006.01)
  *G01C 21/00* (2006.01)
(52) U.S. Cl. ............. 712/34; 342/357.12; 701/213
(58) Field of Classification Search ............ None
See application file for complete search history.

(56) References Cited

U.S. PATENT DOCUMENTS 5,577,216 A * 11/1996 Amasaki et al. ......... 712/200
5,577,250 A * 11/1996 Anderson et al. ........ 718/100
6,002,363 A   12/1999 Krasner
6,452,961 B1   9/2002 Van Wechel
6,965,760 B1 * 11/2005 Chen et al. ............ 455/226.1
2003/0039228 A1   2/2003 Shiu et al.
2004/0088108 A1   5/2004 Bloebaum et al.
2004/0213334 A1  10/2004 Ledvina et al.
2005/0047492 A1   3/2005 Amerga et al.

OTHER PUBLICATIONS

Hanada et al., Fast Cell Search Algorithm in Idle Mode for Inter-Cell Asynchronous W-CDMA Mobile Radio, IEICE Trans. Commun., vol. E83-B, No. 8., Aug. 2000, pp. 1610-1618.
Ledvina et al. A 12-Channel Real-Time GPS L1 Software Receiver, Proceedings of the Ion National Technical Meeting, The Institute of Navigation, US, Dec. 12, 2002, pp. 1-16.
Sagiraju et al., A Fast Acquisition Algorithm for Indoor Software Receivers, ION 61st Annual Meeting, Jun. 27-29, 2005, pp. 563-573.
International Search Report, PCT/US2007/061029, International Search Authority/EPO, Nov. 13, 2007 (2 pages).

* cited by examiner

*Primary Examiner*—Kenneth S Kim
(74) *Attorney, Agent, or Firm*—Andrea L. Mays; Arnold J. Gum (57) ABSTRACT

A circuit to detect position signals in a mobile station includes a general-purpose processor to generate instructions for execution of at least one signal detection algorithm and to carry out at least one other function not associated with the signal detection algorithm, special-purpose hardware blocks responsive to the instructions of the general-purpose processor to execute the at least one signal detection algorithm, and at least one of the general-purpose processor and the special-purpose hardware blocks configured to execute at least one efficiency process to optimize performance of the at least one signal detection algorithm. Methods and machine-readable medium implementing the method steps are also disclosed.

41 Claims, 10 Drawing Sheets

PRIOR ART

FIGURE 10

PROCESSOR GENERATING CONTROL SIGNALS INCLUDING DETECTION DURATION FOR SATELLITE POSITIONING SYSTEM RANGING SIGNAL DETECTION CIRCUIT

CROSS-REFERENCE TO RELATED APPLICATIONS

This application claims priority under 35 U.S.C. §119(e) to provisional U.S. Patent Application No. 60/815,675, filed on Jun. 21, 2006, entitled, "Methods for Coping with Inefficiency from General Purpose Processors in Implementing Signal Detection Algorithms", and assigned to the assignee hereof, the disclosure of which is expressly incorporated by reference herein in its entirety.

BACKGROUND

1. Field

The methods and devices described herein are directed generally to coping with and compensating for inefficiencies in general purpose processors such as encountered when implementing signal processing and similar algorithms and, more particularly, when implementing signal detection algorithms for positioning applications.

2. Background Information

Many devices, such as mobile stations and the like, include circuits for implementing algorithms, such as algorithms for the detection of wireless signals and the like. When implementing algorithms, such as signal detection algorithms, there is a need for processing with low latency, high interrupt capability and high band width. Accordingly, these algorithms conventionally have been implemented using special-purpose dedicated hardware blocks that are controlled by custom micro-controllers instead of general purpose processors.

Figure 10:
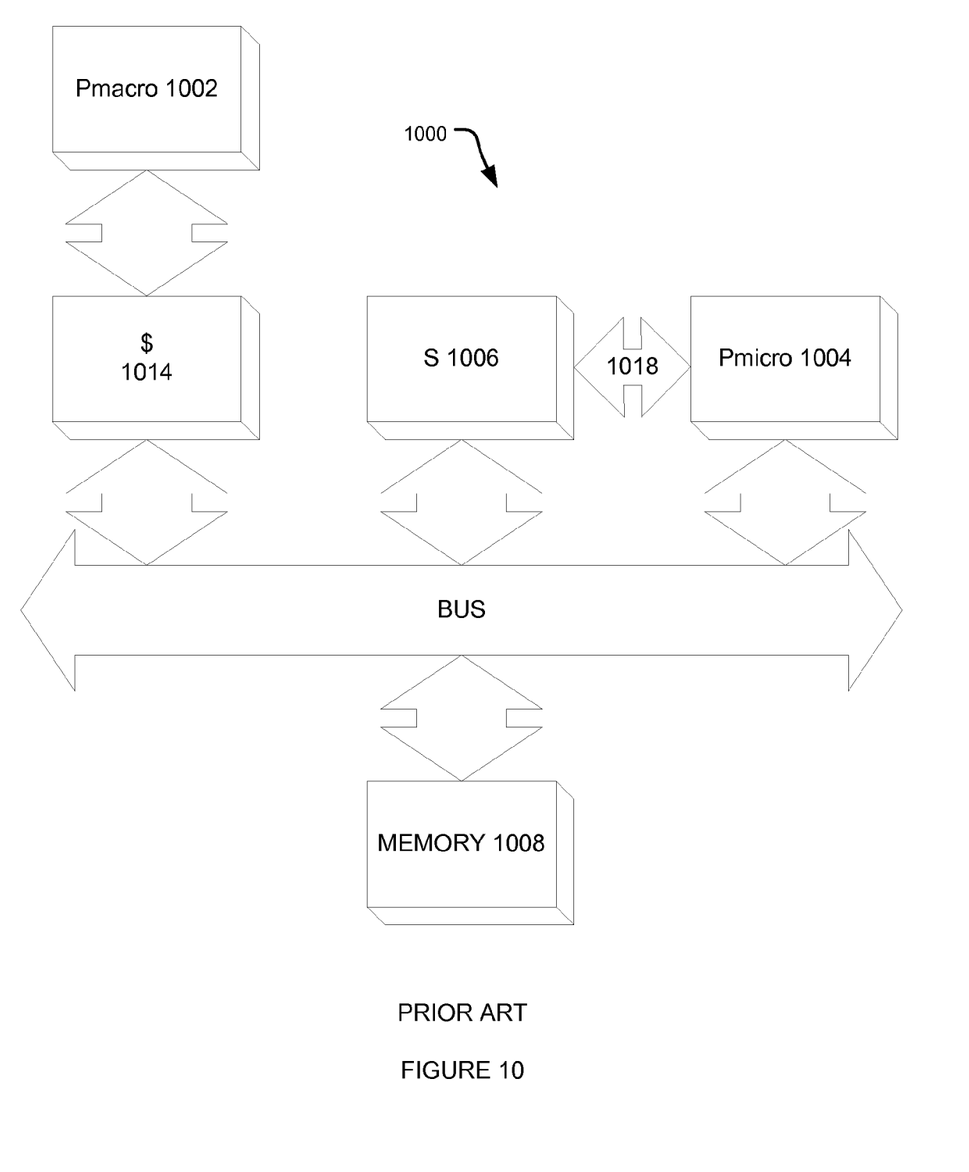
FIG. 10 is a conventional circuit having a custom micro-controller controlling specialized hardware blocks executing digital signal detection algorithms.

One example of such a conventional device is shown in FIG. 10, which shows a typical conventional circuit 1000 for use in a mobile station or the like, which has special-purpose hardware blocks S 1006 controlled by a custom micro-controller Pmicro 1004. Such custom micro-controllers are generally referred to as digital signal processing (DSP) processors, modems, modem DSPs, processors, search engines, or the like. The circuit 1000 typically includes a general-purpose processor such as Pmacro 1002 to provide control signals to or control of Pmicro 1004 via bus/memory interface 1014. The control signals are typically high-level instructions. The control of the special-purpose hardware blocks S 1006 by Pmicro 1004 is via an interface 1018.

The custom micro-controller Pmicro 1004 of the conventional device is specially designed (dedicated) for its application. The custom micro-controller Pmicro 1004 is configured to use specialized instructions in order to control the special-purpose hardware blocks S 1006. Pmicro 1004 is typically configured to sustain high rates of interrupts and can communicate with the special-purpose hardware blocks S 1006 with low latency and high bandwidth. This is due, in part, to the fact that Pmicro 1006 has a highly integrated design. This arrangement is particularly useful in digital signal processing, such as signal detection.

However, there are a number of problems and disadvantages that result from the use of a custom micro-controller, such as a Pmicro 1004, in these types of applications. For example, such custom devices have a high cost of implementation in terms of the die size resulting in higher manufacturing costs, complexity, and so on. The maintenance and development of code that a custom micro-controller, such as Pmicro 1004 uses, also increases costs. In particular, such code maintenance and development requires specialized skills. These skills may relate to the actual special-purpose for which the custom micro-controller is used for, including for example, custom assembly programming for the custom micro-controller and the infrastructure of the custom micro-controller.

Implementation costs could be reduced by eliminating the customer micro-controller. In the absence of the custom micro-controller the circuit 1000 would have to control the special-purpose hardware blocks S 1006 directly from the general-purpose processor. However, control by the general-purpose processor would have significant problems and shortcomings including a high latency, low sustainable interrupt rate and low communication bandwidth such that a skilled artisan would not consider such an approach to be workable. In particular, because these factors would be adversely effected by a few orders of magnitude compared to the designs including the custom micro-controller the skilled artisan would reject this approach.

Accordingly, there is a need for executing complex signal processing algorithms, in particular signal detection algorithms for positioning applications, in a more efficient and cost effective manner than the conventional custom micro-controller implementation provides, while at the same time providing the low latency, high sustainable interrupt rates and large bandwidths achievable with custom micro-controller designs.

SUMMARY

The methods and devices described herein meet the foregoing need and avoid the disadvantages and drawbacks of the prior art by executing a signal processing algorithm using a general-purpose processor instead of a custom micro-controller via use of one or more coping techniques, which allow the general-purpose processor to operate more efficiently. The novel coping methods result in a significant implementation cost savings and other advantages apparent from the discussion herein.

While that described herein is particularly advantageous for signal detection algorithms used in a mobile station of a Satellite Positioning System (SPS), the skilled artisan will appreciate that the methods and devices are applicable to other applications, including any signal detection and demodulation applications where long signal integration can be employed where it is desirable to operate without a custom-microcontroller. Hence, the methods and devices may be applicable to dedicated general processors and processors executing algorithms not involving digital signal processing, but having similar problems as those described herein.

According to one aspect, a circuit to detect position signals in a mobile station includes a general-purpose processor to generate instructions for execution of at least one signal detection algorithm and to carry out at least one other function not associated with the signal detection algorithm, special-purpose hardware blocks responsive to the instructions of the general-purpose processor to execute the at least one signal detection algorithm, and at least one of the general-purpose processor and the special-purpose hardware blocks configured to execute at least one efficiency process to optimize performance of the at least one signal detection algorithm.

The at least one efficiency process may include at least one of a search duration process, an instruction dependency reduction process, a data exchange reduction process, a code organization process, and a memory caching process. The search duration process may include executing shorter searches when there are stringent time constraints and performing longer searches when there is less demand for the general-purpose processor. The dependency reduction process further may include running algorithms in parallel and/or running multi-tier algorithms using floating point units. The data exchange reduction process may include determining critical data to be exchanged between the general-purpose process and the special-purpose hardware blocks, and communicating only the critical data to the general-purpose processor. The code organization process may include at least one of lookahead instruction processing and pipelining. The memory caching may include caching an output of the special-purpose hardware blocks. The memory caching process may include caching an output of the special-purpose hardware blocks, e.g., while the general-purpose processor is unavailable.

According to another aspect, a method of detecting position signals in a mobile station includes the steps of: generating instructions in a general-purpose processor for execution of at least one signal detection algorithm and to carry out at least one other function not associated with the signal detection algorithm; in response to the instructions from the general-purpose processor, executing the at least one signal detection algorithm in special-purpose hardware blocks; and executing at least one efficiency process optimizing the performance of the algorithm.

The step of executing at least one efficiency process may include at least one of the steps of implementing a search duration process, implementing an instruction dependency reduction process, implementing a data exchange reduction process, implementing a code organization process, and implementing a memory caching process. The step of implementing a search duration process may include executing shorter searches when there are stringent time constraints and performing longer searches when there is less demand for the general-purpose processor. The step of implementing a dependency reduction process further may include running algorithms in parallel, and/or running multi-tier algorithms using floating point units. The step of implementing a data exchange reduction process may include determining critical data to be exchanged between the general-purpose processor and the special-purpose hardware blocks, and communicating only the critical data to the general-purpose processor. The step of implementing a code organization process may include at least one of lookahead instruction processing and pipelining. The step of implementing a memory caching process may include caching an output of the special-purpose hardware blocks, e.g., while the general-purpose processor is unavailable.

In yet another aspect, a machine-readable medium includes instructions, which, when executed by at least one of a general-purpose processor and special-purpose hardware blocks cause the special-purpose hardware blocks to detect position signals, the instructions include instructions to generate instructions in a general-purpose processor for execution of at least one signal detection algorithm, instructions to carry out at least one other function not associated with the signal detection algorithm in the general-purpose processor, instructions for execution of the at least one signal detection algorithm in special-purpose hardware blocks in response to the instructions from the general-purpose processor, and instructions for execution of at least one efficiency process in at least one of the general-purpose processor and the special-purpose hardware blocks to optimize performance of the algorithm.

The instructions for execution of at least one efficiency process may include at least one of instructions for execution of a search duration process, instructions, for execution of an instruction dependency reduction process, instructions for execution of a data exchange reduction process, instructions for execution of a code organization process, and instructions for execution of a memory caching process. The instructions for execution of a search duration process may include executing shorter searches when there is stringent time constraints and performing longer searches when there is less demand for the general-purpose processor. The instructions for execution of a dependency reduction process further may include instructions for execution of algorithms in parallel and/or for execution of multi-tier algorithms using floating point units. The instructions for execution of a data exchange reduction process may include instructions for determination of critical data to be exchanged between the general-purpose processor and the special-purpose hardware blocks, and communicating only the critical data. The instructions for execution of a code organization process may include at least one of lookahead instruction processing and pipelining. The instructions for execution of memory caching may include caching an output of the special-purpose hardware blocks, e.g., while the general-purpose processor is unavailable.

In yet another aspect, a circuit to detect position signals in a mobile station includes means for generating instructions in a general-purpose processor for execution of at least one signal detection algorithm and for carrying out at least one other function not associated with the signal detection algorithm, means for executing the at least one signal detection algorithm in special-purpose hardware blocks in response to the instructions of the general-purpose processor, and means for executing at least one efficiency process in at least one of the general-purpose processor and the special-purpose hardware blocks to optimize performance of the at least one signal detection algorithm.

The at least one efficiency process may include at least one of a search duration process, an instruction dependency reduction process, a data exchange reduction process, a code organization process, and a memory caching process. The search duration process may include executing shorter searches when there are stringent time constraints and performing longer searches when there is less demand for the general-purpose processor. The dependency reduction process may include running algorithms in parallel and/or running multi-tier algorithms using floating point units. The data exchange reduction process may include determining critical data to be exchanged between the general-purpose process and the special-purpose hardware blocks, and communicating only the critical data to the general-purpose processor. The code organization process may include at least one of lookahead instruction processing and pipelining. The memory caching process may include caching an output of the special-purpose hardware blocks, e.g., while the general-purpose processor is unavailable.

Additional features, advantages, and embodiments of the methods and devices described herein may be set forth or apparent from consideration of the following detailed description, drawings, and claims. Moreover, it is to be understood that both the foregoing summary and the following detailed description are exemplary and intended to provide further explanation without limiting the scope of the methods and devices as claimed.

BRIEF DESCRIPTION OF THE DRAWINGS

The accompanying drawings, which are included to provide a further understanding of the methods and devices described herein, are incorporated in and constitute a part of this specification, illustrate aspects of the methods and devices and together with the detailed description serve to explain the principles of these methods and devices. No attempt is made to show structural details of these methods and devices in more detail than may be necessary for fundamental understanding of them and the various ways in which they may be practiced. In the drawings.

DETAILED DESCRIPTION

Various aspects of the methods and devices described herein and the advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments. The examples used herein are intended merely to facilitate an understanding of ways in which the principles of the methods and devices described herein may be practiced and to further enable those of skill in the art to practice the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 1:
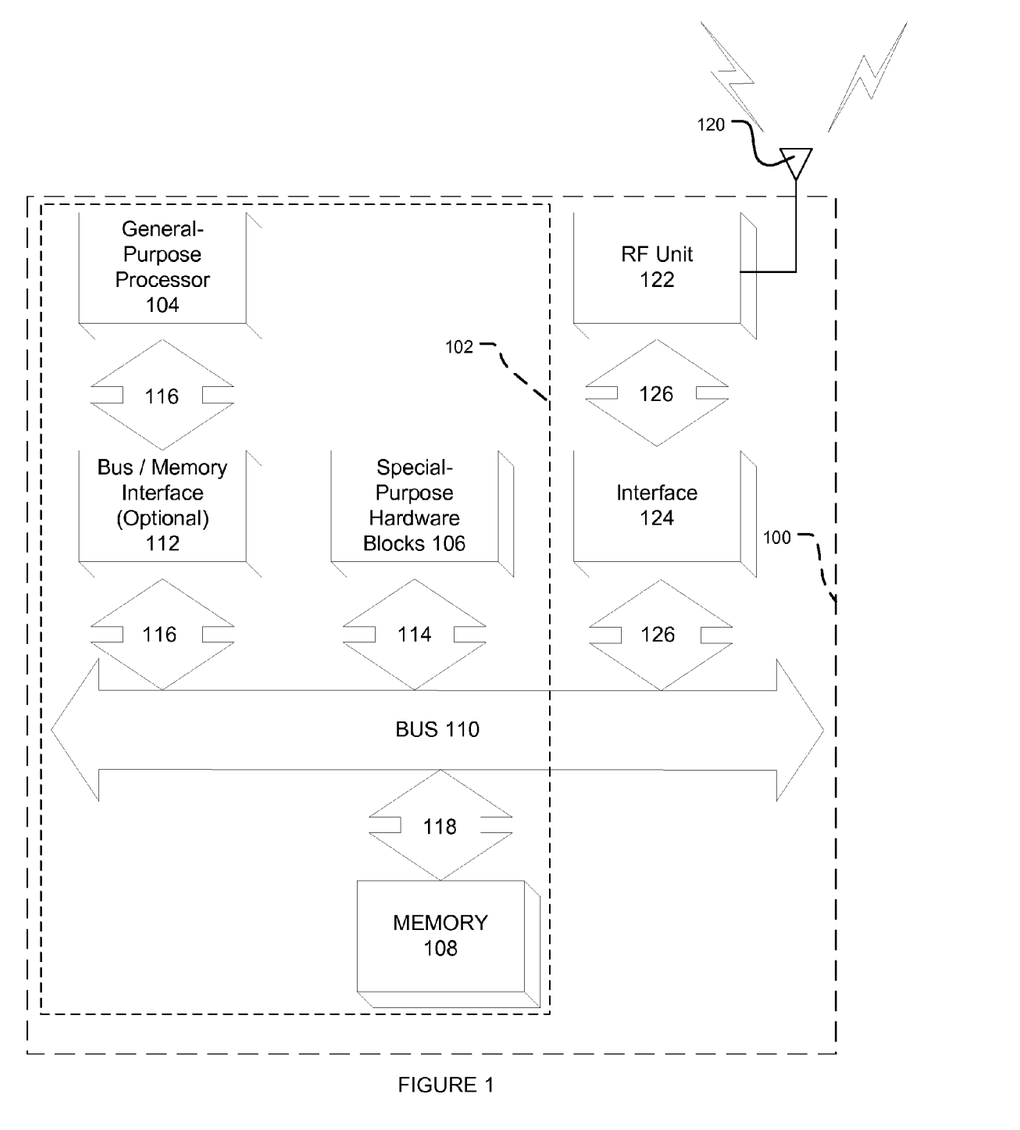
FIG. 1 is a schematic diagram showing a device constructed according to the principles described herein for coping with inefficiency from general purpose processors in implementing algorithms, in a mobile station.

FIG. 1 is a schematic diagram showing an exemplary device constructed according to the principles of the invention in a mobile station. More specifically, FIG. 1 shows an exemplary arrangement and configuration of a mobile station 100 for use in receiving wireless signals from a Satellite Positioning System (SPS) (not shown). The mobile station 100 includes a circuit 102 that may implement an algorithm, such as a digital signal processing algorithm for signal detection or acquisition from the SPS.

The mobile station 100 may be configured to operate in a wireless environment. More specifically, the mobile station 100 may include an antenna 120 to receive a wireless signal. The wireless signal may be any of the radio access technologies (RATs) described below. The wireless signal may be received into a radio frequency unit 122 in a manner well known in the art. An interface 124 as shown in FIG. 1 may be responsive to the radio frequency unit 122. The interface 124 may include one or more components, including links 126, 126, to process the wireless signal and direct it into the circuit 102 for processing as described below and as is well known in the art.

Special-purpose hardware blocks 106 are arranged in the circuit for executing a signal processing algorithm such as a signal detection or acquisition algorithm. The special purpose hardware blocks 106 may interact with data and/or control signals via interface 114 to a bus 110. A general-purpose processor 104 provides control to the special-purpose hardware blocks 106. There is no custom micro-controller controlling the hardware blocks 106. The control of the special-purpose hardware blocks 106 may be via a bus/memory interface 112 via interfaces 116, 116 to bus 110. Such an interface is optional and the general purpose processor 104 may communicate with the special-purpose hardware block 106 in any known manner.

Additionally the circuit 102 may include a memory 108 interfacing bus 110 via an interface 118. Moreover, the general-purpose processor 104 may include a hardware accelerator as is well-known in the art. It should be noted that the arrangement of the various components shown in FIG. 1 is merely exemplary. In that regard, the circuit 102 may include more or less components, a different arrangement of more or less components, and so on. The arrangement of FIG. 1 is exemplary and other arrangements are within the spirit and scope of the invention as long as the circuit 102 does not include a custom micro-controller for controlling the special-purpose hardware blocks 106. The lack of custom micro-controller greatly reduces the cost of implementation of the circuit 102. More specifically, the circuit 102 may be manufactured with less cost due, in part, to a reduced manufacturing die size and complexity. Moreover, the circuit 102 has reduced cost of implementation with respect to code, coding the custom micro-controller and code maintenance. However, the circuit 102 would suffer from numerous, significant (order of magnitude) short comings including high latency, low sustainable interrupt rate, reduced bandwidth and so on when compared to a conventional circuit that employed a custom micro-controller (as shown in FIG. 10) without the below described coping configurations and/or methods of the invention.

Figure 2:
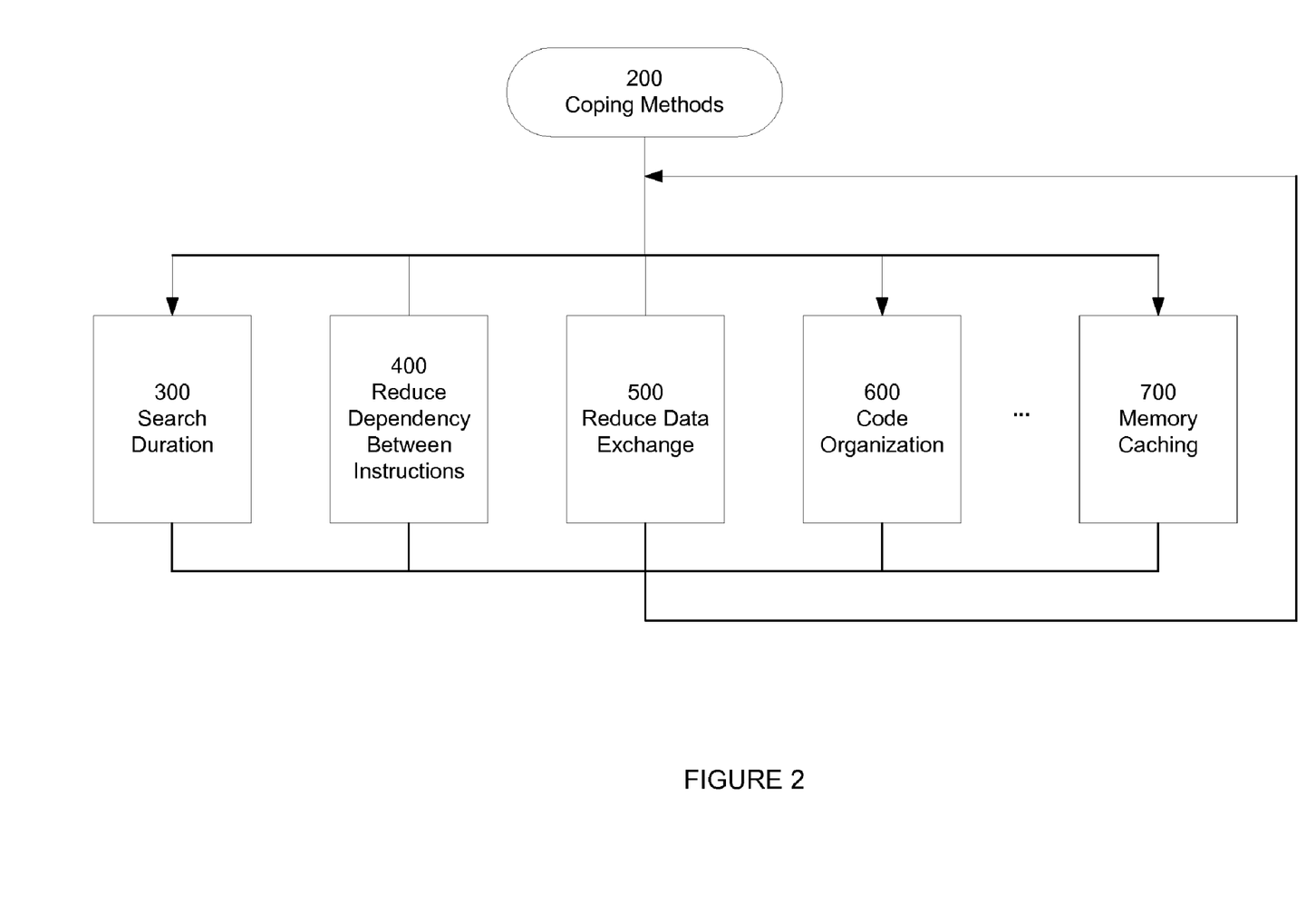
FIG. 2 is a flow chart showing various coping methods that may be used to execute algorithms with the use of a general-purpose processor instead of a custom micro-controller.

The various methods of the invention to mitigate the short comings and to cope with the inefficiencies in the general-processor in implementing algorithms without a custom micro-controller are separately discussed below. However, FIG. 2 graphically shows that one or more of the methods of the invention may be useable together. Thus, the coping methods of the invention may be used together or one or more may be separately implemented. Moreover other coping methods known in the art are contemplated and are thus within the scope and spirit of the invention.

Figure 3:
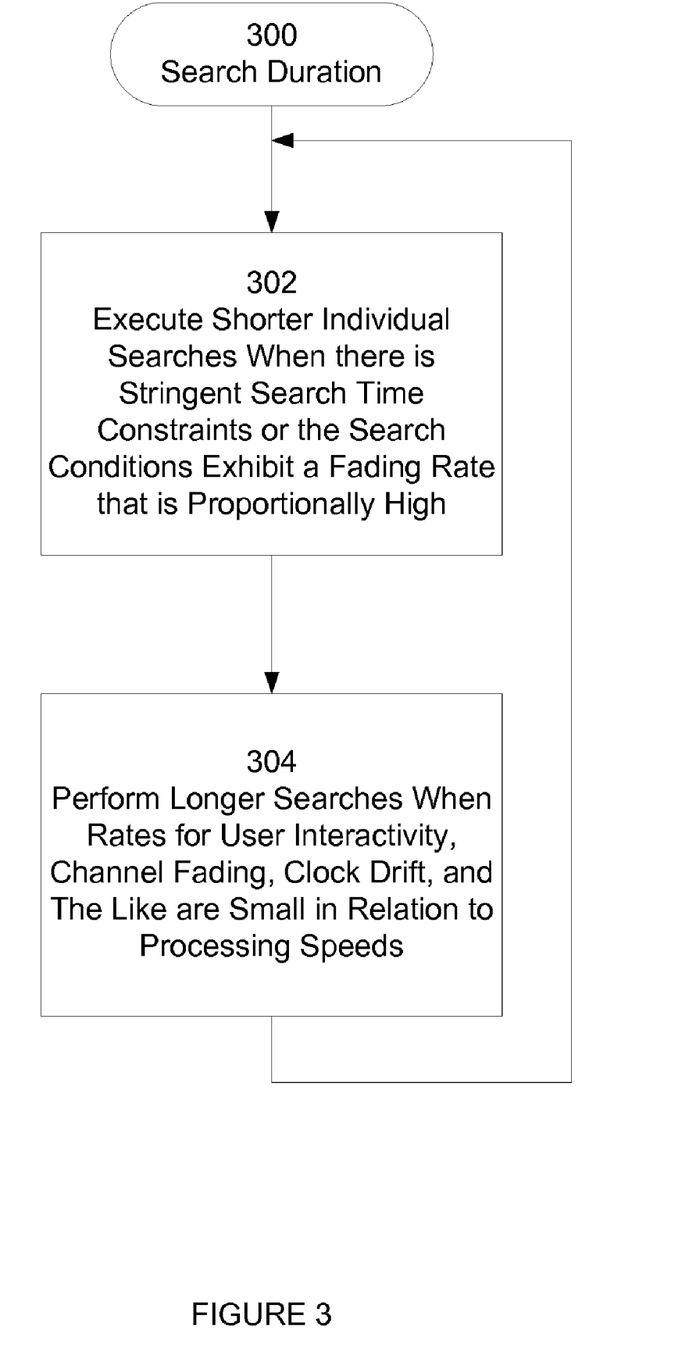
FIG. 3 is a flow chart showing the search duration coping method.

FIG. 3 is a flow chart showing the search duration coping method of the invention. In particular the FIG. 3 method is directed to a search duration 300 method for changing a search duration associated with each instruction given to the special-purpose hardware blocks 106 for signal detection algorithms with searches. By elongating the search duration during certain scenarios associated with each instruction, the control flow may be minimized. Moreover, the selective elongation of the search duration can thus avoid any sort of negative impact upon the over all algorithm performance by implementing shorter searches as needed.

In particular, time constraints and search conditions may be a basis for changing search duration. In step 302, the search duration method may implement shorter individual searches and thus higher search rates when the application has stringent search time constraints or search conditions that exhibit a fading rate that is proportionally high.

Changing the search duration may also be based on other criteria. In one aspect the technique of the search duration 300 method shown in FIG. 3 may exploit the fact that bounds on a length of individual search instructions that are provided to the special-purpose hardware blocks 106 may be derived from high level application parameters. These high level application parameters may include user interactivity factors, low-level channel parameters, and the like, e.g., user interactivity higher than millisecond or microsecond. The user interactivity factors may further include a position application that may request that the location of the mobile user be computed from the results produced by the search engine at some nominal rate of, for example, 1/second. Since the user position is not expected to change at high rates, a new position and thus a new search may not need to occur at rates higher than such nominal rate. Another example is handover support for users moving from one cell to another. Periodic sampling of the signal environment (signal detection and/or demodulation) may allow the detection of signals from new base stations and thus the initiation of the handover process. However, the rate of change can again be considered to be low, e.g. no higher than 1/ms. The low-level channel parameters may include fading rates, clock drifts, and so on.

As shown in step 304, when it is determined that the rates for user interactivity, channel fading, clock drift are small in relation to processing speeds of the general-purpose processor 104, or the like, the searches may be performed with a longer duration while meeting the desired search rate constraints. Of course, the search duration may be changed based on any type of criteria in order to make the general-purpose processor 104 more efficient.

Accordingly, by selectively changing the search duration associated with each instruction given to the special-purpose hardware blocks 106, call control may be minimized and the overall algorithm performance minimally impacted.

Figure 4:
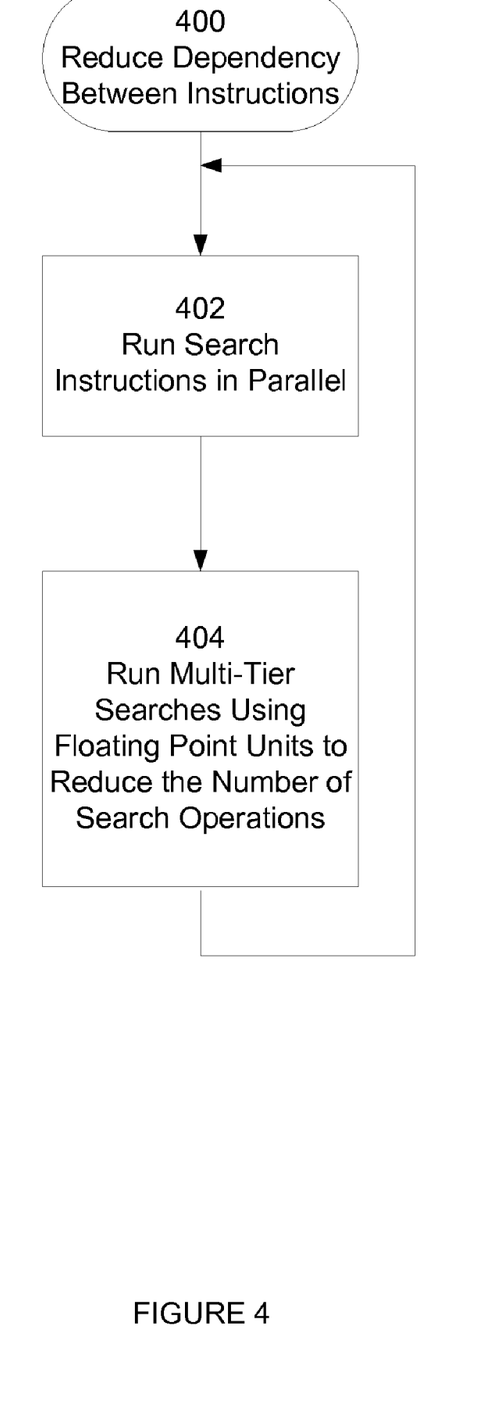
FIG. 4 is a flow chart showing the reduce dependency between instructions coping method.

FIG. 4 is a flow chart showing the reduce dependency between instructions coping method of the invention. In particular, this aspect of the invention reduces the dependency between instructions that are provided to the special-purpose hardware blocks 106 as shown by step 400. With step 402, reduction of the dependency between instructions first takes advantage of the fact that many search instructions may be viewed as independent of one another and may be run in parallel in the special-purpose hardware blocks 106. More specifically, as shown in step 402, searching various parameters such as different time, frequency, code hypotheses, and the like may be done in parallel. This parallel searching allows the ability to obtain search results at an accelerated rate.

Next, prior approaches typically required multi-tier searches to take place sequentially for a given combination of time and/or frequency code hypotheses. This was due, in part, to limitations in the dynamic range of searches. For example, searches would have to be executed in order to cover each 1/N segment of a desired dynamic range. Typically, these N searches would have to be executed sequentially, and in a dependent fashion to reduce the need for unnecessary signal searches and ranges that are not applicable. This sequential operation increased the amount of time required in order to implement the N searches.

As shown in step 404, the invention searches may be implemented using a floating point units approach. The use of floating point units allows for the entire dynamic range to be covered with a single search operation. By reducing the number of search operations, the need for sequential searches and/or search operations, instruction dependency is avoided. Thus, the search process time may be greatly reduced. Additionally, other types of algorithms may employ the parallel and floating point units methods. Accordingly, the various aspects of the FIG. 3 methods reduce the dependency between instructions and thus reduce the amount time to execute searches.

Figure 5:
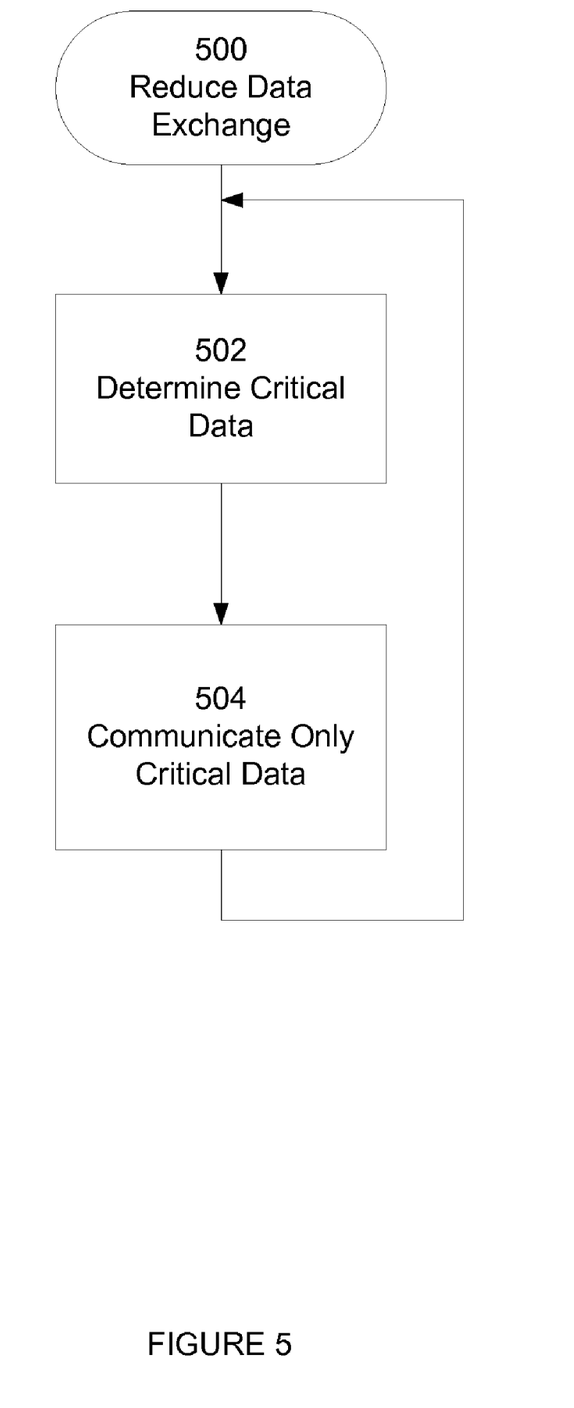
FIG. 5 is a flow chart showing the reduce data exchange coping method.

FIG. 5 is a flow chart showing the reduce data exchange coping method of the invention. This aspect of the method of the invention is specifically directed towards reducing data exchange between the general-purpose processor 104 and the special purpose hardware blocks 106. In particular, this aspect of the invention takes advantage of the fact that algorithms generally produce large amounts of signal detection data of which only a fraction of the data is needed. By determining the data that is worth inspecting (the "critical data block") and transmitting only this data between the special-purpose hardware blocks 106 in the general-purpose processor 104, the overall data exchange may be reduced. For example, signal detection algorithms require that only the data associated with the strongest signal peak or some of the stronger signal peaks be inspected for the signal detection process.

In step 502, the special-purpose hardware block 106 may determine what is the critical data that is worth inspecting by the general-purpose processor 104. For example, in signal processing this may be implemented as a peak sorter that is implemented in the special-purpose hardware block 106. The peak sorter may then determine the index and the value of the strongest peak or stronger peaks. In step 504, only the strongest peak and/or stronger peak data is communicated to the general-purpose processor 104. The less "critical data" is not sent to the general-purpose processor 104 and thus the data exchange is reduced and the general-purpose processor 104 is able to operate more efficiently.

Figure 6:
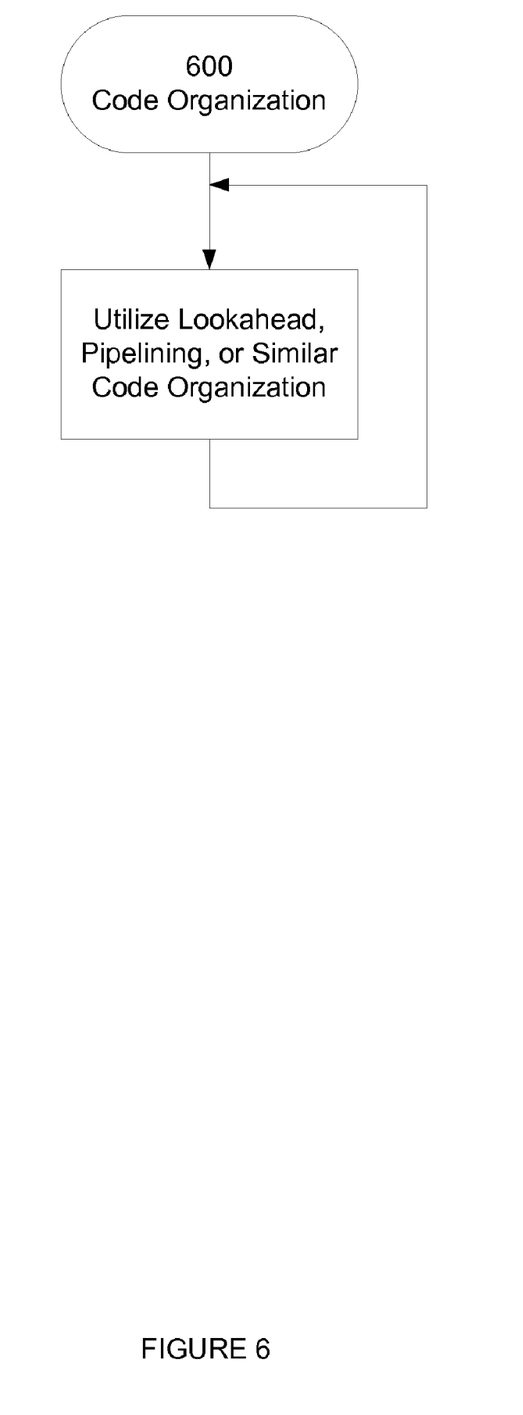
FIG. 6 is a flow chart showing the code organization coping method.

FIG. 6 is a flow chart showing the code organization coping method of the invention. This aspect of the invention may use some of the steps shown in FIG. 5 and further may use various code organization approaches. More specifically, this aspect of the invention may use various forms of code organization in the general-purpose processor 104 in order to execute the algorithm more efficiently.

Some of the various types of code organization 600 that may be used in this aspect of the invention include the use of a lookahead and/or pipelined instructions for use in the general-purpose processor 104 and/or the special-purpose hardware block 106. The lookahead approach may be thought of as a sub procedure that tends to foresee the effects of choosing a branching variable to evaluate one of its values. The two main aims of the lookahead approach are to choose a variable to evaluate next and the order of values to assign to it. The pipelining approach may utilize a set of data processing elements connected in series, so that an output of one element is the input to the next. Pipelining reduces cycle time of a processor and increases instruction throughput, and the number of instructions that can be executed in a unit of time. A pipeline instruction may prevent branch delays and other problems with serial instructions being executed concurrently.

Accordingly, the use of lookahead and/or pipeline instructions together with the FIG. 5 reduce data exchange technique provides for a more efficient operation of the general-purpose processor in executing algorithms. Additionally, other code organization approaches known in the art are also contemplated and are in the scope of the invention.

Figure 7:
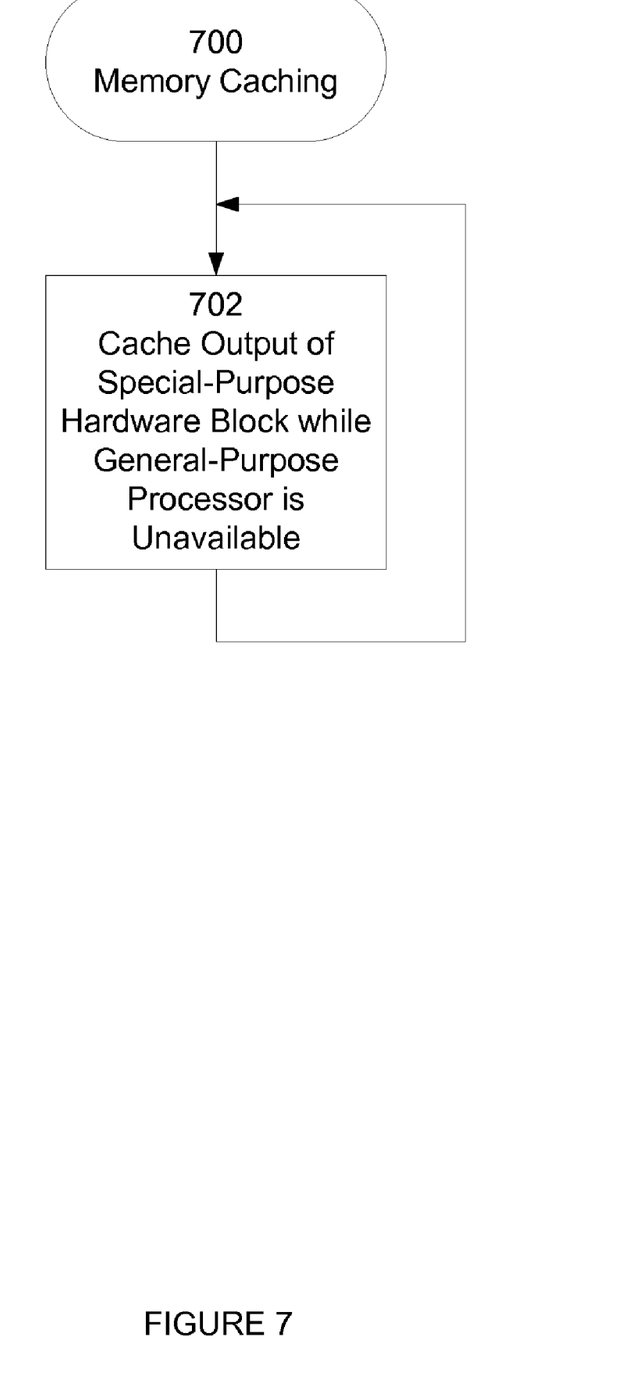
FIG. 7 is a flow chart showing the memory caching coping method.

FIG. 7 is a flow chart showing the memory caching coping method of the invention. In particular, the use of memory buffers hides or reduces the latency of the general-purpose processor 104 and allows the special-purpose hardware blocks 106 to run more efficiently. More specifically, this aspect of the invention may use memory caching techniques 700 in order to provide more efficient algorithm implementation. For example, the output data from the special-purpose hardware block 106 may be buffered as shown in step 702 for a duration that the general-purpose processor 104 is unavailable. In this regard, the general-purpose processor 104 may suffer from various latency related performance issues. Moreover, the presence of the various memory allocation constraints used in the FIG. 3 and the FIG. 5 techniques of the invention minimize the output data rate from the special-purpose hardware blocks 106, keeps the data from being communicated to the general purpose processor 104. To overcome this restriction, the data that is needed by general-purpose processor 104 may be stored in a memory buffer. Accordingly, the use of memory buffers reduces or hides the latency of the general-purpose processor 104 and allows the special-purpose hardware block 106 to run more efficiently.

Figure 8:
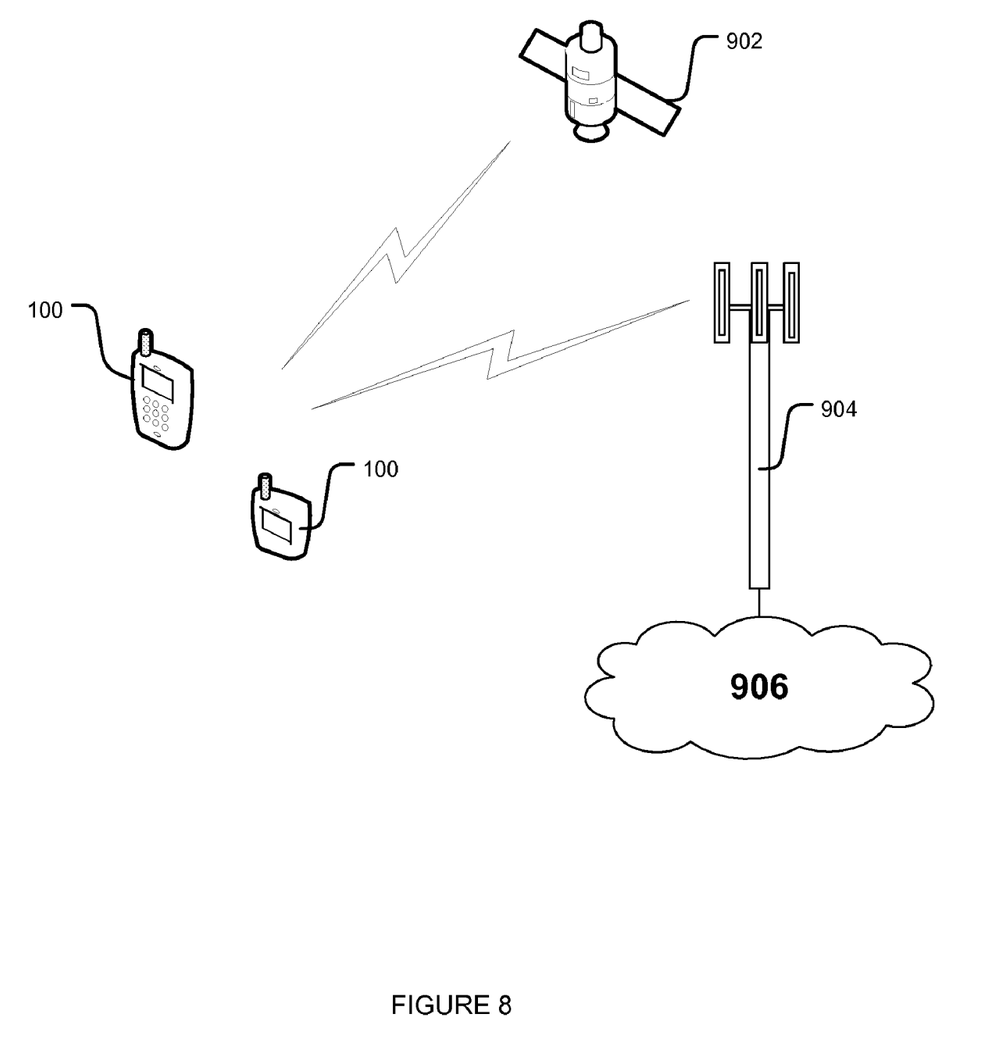
FIG. 8 is a schematic diagram showing an implementation of two different mobile stations together in a satellite and/or cellular system constructed according to the principles described herein.

The position determination techniques, including signal processing and acquisition, described herein may be used for various wireless communication networks 906 such as those associated with an antenna 904 shown in FIG. 8 for use with various mobile stations 100, such as a wireless wide area network (WWAN), a wireless local area network (WLAN), a wireless personal area network (WPAN), and so on. As used herein, mobile station (MS) refers to a device such as a cellular telephone, wireless communication device, user equipment, other personal communication system (PCS) device, a position determination device employing position determination techniques or the like. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

As further shown in FIG. 8, a mobile station 100, 100 may receive signals from satellite(s) 902, which may be from a Global Positioning System (GPS), Galileo, GLONASS, NAVSTAR, GNSS, a system that uses satellites from a combination of these systems, or any SPS developed in the future, each referred to generally herein as a Satellite Positioning System (SPS). As used herein, an SPS will also be understood to include pseudolite systems.

The method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed methods and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite" as used herein, is intended to include pseudolites, equivalents of pseudolites, and possibly others. The term "SPS signals" as used herein, is intended to include SPS-like signals from pseudolites or equivalents of pseudolites.

Figure 9:
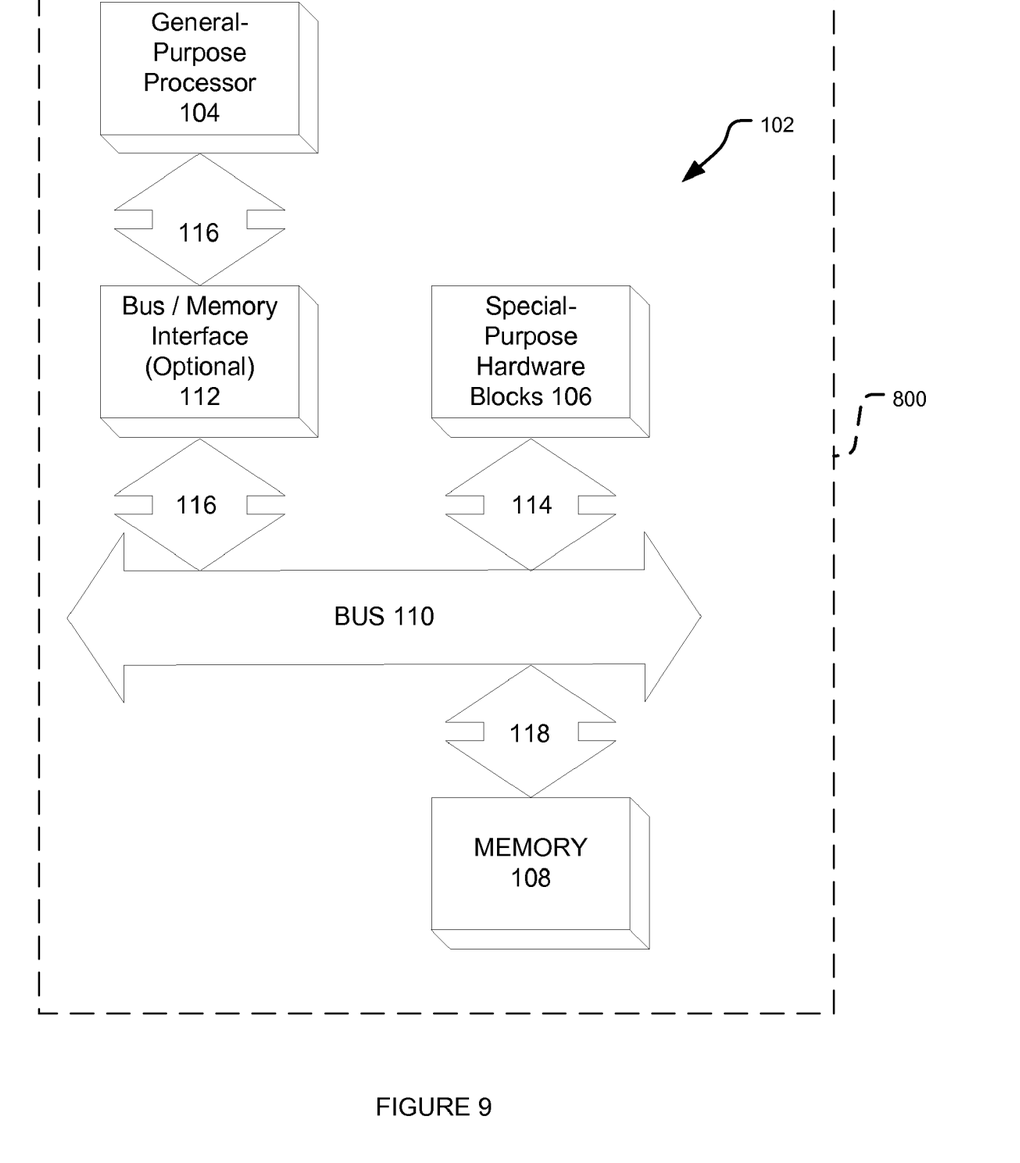
FIG. 9 is a schematic diagram showing another circuit constructed according to the principles described herein that may be used in other applications than mobile stations.

While the coping techniques of the invention described above are particularly advantageous for use in a mobile station receiving wireless signals from a SPS, one or more of these coping techniques may be used in other digital signal processing environments outside of the SPS signal detection and/or acquisition environment. Moreover, the skilled artisan will appreciate that the various techniques above may be equally applicable to non-digital signal processing environments suffering from similar constraints. FIG. 9 shows a circuit implementation with components arranged and operated substantially similar to that of FIG. 1 outside the mobile station environment but which, prior to the invention, also required a custom micro-controller in order to efficiently operate. However, the device 800 has been modified to operate according to the principles of the invention. Thus, the various coping methods of the invention described above may be implemented in non-digital signal processing applications such as those shown in FIG. 9 in device 800. Moreover, the device 800 shown in FIG. 9 may use a dedicated general processor. Such an arrangement shown in FIG. 9 is most advantageous when operated in a device 800 where user interactivity requirements are relatively lower than a millisecond or microsecond. Similarly, device 800 may be most advantageous when implemented in devices having longer integration or a long coherent integration period.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 108 of mobile station 100, and executed by a processor, for example the general-purpose processor 104. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A circuit to detect position signals in a mobile station comprising:
    a general-purpose processor configured to generate control signals to carry out signal detection and to carry out at least one other function not associated with the signal detection; and
    a detection circuit configured to respond to the control signals generated by said general-purpose processor to detect ranging signals from a Satellite Positioning System (SPS) in accordance with a signal detection algorithm, said signal detection algorithm having associated therewith a duration indicative of a duration of time for conducting detection of said ranging signals,
    wherein either said general-purpose processor or said detection circuit is further configured to change said duration based on a predetermined search rate constraint and at least one of a user interactivity rate, channel fading, or clock drift, and wherein the general purpose processor generates the control signals based in part on the duration.

2. The circuit according to claim 1 wherein said change of said duration is performed by at least one of an instruction dependency reduction process, a data exchange reduction process, a code organization process, or a memory caching process.

3. The circuit according to claim 1 wherein said duration is changed to produce shorter searches when there are stringent time constraints and to produce longer searches when there is less demand for said general-purpose processor.

4. The circuit according to claim 2 wherein said dependency reduction process further comprises running algorithms in parallel.

5. The circuit according to claim 4 wherein said dependency reduction process comprises running multi-tier algorithms using floating point units.

6. The circuit according to claim 2 wherein said data exchange reduction process comprises determining critical data to be exchanged between said general-purpose processor and said detection circuit.

7. The circuit according to claim 6 wherein said data exchange reduction process comprises communicating only the critical data to said general-purpose processor.

8. The circuit according to claim 2 wherein said code organization process comprises at least one of lookahead instruction processing and pipelining.

9. The circuit according to claim 2 wherein said memory caching comprises caching an output of said detection circuit.

10. The circuit according to claim 2 wherein said memory caching process step comprises caching an output of said detection circuit while said general-purpose processor is unavailable.

11. A method of detecting position signals in a mobile station comprising the steps of:
    generating control signals in a general-purpose processor for to carry out signal detection and to carry out at least one other function not associated with the signal detection;
    in response to the control signals from the general-purpose processor, detecting with a detection circuit ranging signals from a Satellite Positioning System (SPS) in accordance with a signal detection algorithm, said signal detection algorithm having associated therewith a duration indicative of a duration of time for conducting detection of said ranging signals; and
    changing said duration based on a predetermined search rate constraint and at least one of a user interactivity rate, channel fading, or clock drift,
    wherein generating the control signals is based in part on the duration.

12. The method according to claim 11 wherein said step of changing the duration comprises at least one of the steps of:
    implementing an instruction dependency reduction process;
    implementing a data exchange reduction process;
    implementing a code organization process; and
    implementing a memory caching process.

13. The method according to claim 11 wherein said duration is changed to shorter searches when there are stringent time constraints and is changed to longer searches when there is less demand for the general-purpose processor.

14. The method according to claim 12 wherein said step of implementing a dependency reduction process further comprises running algorithms in parallel.

15. The method according to claim 12 wherein said step of implementing a dependency reduction process comprises running multi-tier algorithms using floating point units.

16. The method according to claim 12 wherein said step of implementing a data exchange reduction process comprises determining critical data to be exchanged between the general-purpose processor and the detection circuit.

17. The method according to claim 16 wherein said step of implementing a data exchange reduction process comprises communicating only the critical data to the general-purpose processor.

18. The method according to claim 12 wherein said step of implementing a code organization process comprises at least one of lookahead instruction processing and pipelining.

19. The method according to claim 12 wherein said step of implementing a memory caching process comprises caching an output of the detection circuit.

20. The method according to claim 12 wherein said step of implementing a memory caching process comprises caching an output of the detection circuit while the general-purpose processor is unavailable.

21. A machine-readable medium comprising instructions, which, when executed by at least one of a general-purpose processor or a detection circuit cause the detection circuit to detect position signals, the instructions comprising:
- instructions to generate control signals in a general-purpose processor to carry out signal detection;
- instructions to carry out at least one other function not associated with the signal detection in the general-purpose processor;
- instructions to detect ranging signals from a Satellite Positioning System (SPS) in accordance with at least one signal detection algorithm in response to the control signals from the general-purpose processor, said signal detection algorithm having associated therewith a duration indicative of a duration of time for conducting detection of said ranging signals; and
- instructions to change said duration based on a predetermined search rate constraint and at least one of a user interactivity rate, channel fading, or clock drift, and
- wherein the instructions to generate the control signals are based in part on the duration.

22. The machine-readable medium according to claim 21 wherein said instructions to change said duration comprise at least one of:
- instructions for execution of an instruction dependency reduction process;
- instructions for execution of a data exchange reduction process;
- instructions for execution of a code organization process; and
- instructions for execution of a memory caching process.

23. The machine-readable medium according to claim 21 wherein said duration is changed to produce shorter searches when there is stringent time constraints and said duration is changed to perform longer searches when there is less demand for the general-purpose processor.

24. The machine-readable medium according to claim 23 wherein said instructions for execution of a dependency reduction process further comprise instructions for execution of algorithms in parallel.

25. The machine-readable medium according to claim 22 wherein said instructions for execution of a dependency reduction process comprise instructions for execution of multi-tier algorithms using floating point units.

26. The machine-readable medium according to claim 22 wherein said instructions for execution of a data exchange reduction process comprise instructions for determination of critical data to be exchanged between the general-purpose processor and the detection circuit.

27. The machine-readable medium according to claim 26 wherein said instructions for execution of a data exchange reduction process comprises communicating only the critical data.

28. The machine-readable medium according to claim 22 wherein said instructions for execution of a code organization process comprises at least one of lookahead instruction processing and pipelining.

29. The machine-readable medium according to claim 22 wherein said instructions for execution of the memory caching instructions comprises caching an output of the detection circuit.

30. The machine-readable medium according to claim 22 wherein said instructions for execution of a caching process comprises caching an output of the detection circuit while the general-purpose processor is unavailable.

31. A circuit to detect position signals in a mobile station, said circuit comprising:
- means for generating control signals for carrying out signal detection and for carrying out at least one other function not associated with the signal detection;
- means for detecting ranging signals from a Satellite Positioning System (SPS) in accordance with a signal detection algorithm, in response to the control signals of the general-purpose processor, said signal detection algorithm having associated therewith a duration indicative of a duration of time for conducting detection of said ranging signals; and
- means for changing the duration based on a predetermined search rate constraint and at least one of a user interactivity rate, channel fading, or clock drift, and wherein the means for generating the control signals generates the control signals based in part on the duration.

32. The circuit according to claim 31 wherein the means for changing the duration comprises at least one of an instruction dependency reduction process, a data exchange reduction process, a code organization process, and a memory caching process.

33. The circuit according to claim 31 wherein duration is changed to produce shorter searches when there are stringent time constraints and the duration is changed to produce longer searches when there is less demand for the general-purpose processor.

34. The circuit according to claim 32 wherein the dependency reduction process further comprises running algorithms in parallel.

35. The circuit according to claim 34 wherein the dependency reduction process comprises running multi-tier algorithms using floating point units.

36. The circuit according to claim 32 wherein the data exchange reduction process comprises determining critical data to be exchanged between the general-purpose process and the detection circuit.

37. The circuit according to claim 36 wherein the data exchange reduction process comprises communicating only the critical data to the general-purpose processor.

38. The circuit according to claim 32 wherein the code organization process comprises at least one of lookahead instruction processing and pipelining.

39. The circuit according to claim 32 wherein the memory caching process comprises caching an output of the detection circuit.

40. The circuit according to claim 32 wherein the memory caching process comprises caching an output of the detection circuit while the general-purpose processor is unavailable.

41. A circuit to detect position signals in a mobile station comprising:
- a general-purpose processor configured to generate control signals to carry out signal detection and to carry out at least one other function not associated with the signal detection; and
- a detection circuit configured to respond to the control signals generated by said general-purpose processor to detect ranging signals from a Satellite Positioning System (SPS) in accordance with a signal detection algorithm, said signal detection algorithm having associated therewith a duration indicative of a duration of time for conducting detection of said ranging signals, a memory coupled to the general purpose processor and the detection circuit; and wherein at least one of said general-purpose processor or said detection circuit is configured to change the duration of the at least one signal detection algorithm based at least on a predetermined search rate constraint, and determine an availability of the general-purpose processor during execution of the signal detection algorithm, and wherein the general purpose processor generates the control signals based in part on the search duration, and the detection circuit selectively stores output data from the signal detection algorithm to the memory based on the availability of the general-purpose processor.

* * * * *